United States Patent Office
3,766,199
Patented Oct. 16, 1973

3,766,199
MANUFACTURE OF 3-BENZIMIDAZOLYL-COU-
MARINS AS FLUORESCENT COMPOUNDS
Johannes Dehnert, Ludwigshafen, and Gerhard Grau,
Limburgerhof, Germany, assignors to Badische Anilin-
& Soda-Fabrik Aktiengesellschaft, Ludwigshafen
(Rhine), Germany
No Drawing. Filed Feb. 3, 1971, Ser. No. 112,453
Claims priority, application Germany, Feb. 10, 1970,
P 20 05 968.1; Mar. 11, 1970, P 20 11 500.8
Int. Cl. C07d 49/38
U.S. Cl. 260—299                                 3 Claims

ABSTRACT OF THE DISCLOSURE

Manufacture of 3-benzimidazoyl-coumarins comprising the condensation of an o-hydroxybenzaldehyde or o-hydroxynaphthaldehyde with a 2-cyanomethylbenzimidazole in acidic medium. The products are useful as fluorescent dyes.

This invention relates to a new process for the manufacture of fluorescent compounds comprising the condensation of compounds of the general formula

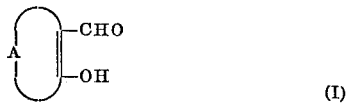

(I)

in which A stands for the completion of an unsubstituted or substituted benzene or naphthalene nucleus, with compounds of the general formula

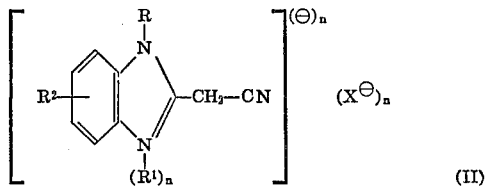

(II)

in which n is 0 or 1, R denotes hydrogen, methyl or ethyl, $R^1$ denotes methyl or ethyl, $R^2$ denotes hydrogen, methyl or methoxy and $X^\ominus$ denotes an anion, in acid solution to form compounds of the general formula

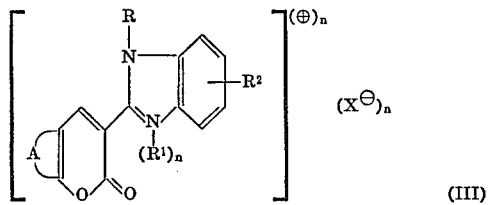

(III)

In the compounds of Formula I the residue A may be substituted, for example, by methyl, ethyl, methoxy, ethoxy, chlorine, bromine, hydroxy, amino or substituted amino, such as phenylamino, dimethylamino, diethylamino, dibutylamino, ethylchloroethylamino or methylphenylamino. Specific examples of compounds of Formula I are

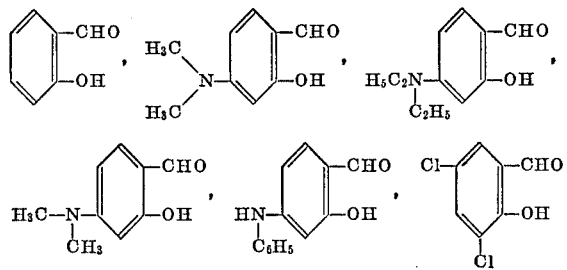

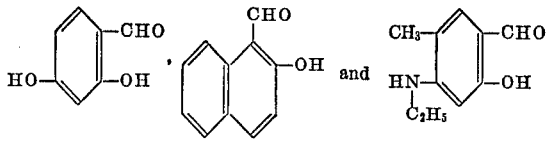

Examples of anions represented by $X^\ominus$ are chloride, bromide, nitrate, sulfate, methosulfate, ethosulfate, benzene sulfonate, toluene sulfonate, formate, acetate, tetrafluoborate and tetrachlorozincate.

The condensation of the compounds of Formula I with the compounds of Formula II is conveniently carried out at a pH of from 0 to 4, preferably from 0 to 2. Suitable acids are, for example, hydrochloric acid, sulfuric acid, monomethyl sulfate, monoethyl sulfate, toluenesulfonic acid, phosphoric acid, hydrogen bromide and trichloroacetic acid.

The process is conveniently carried out by heating the components of Formulae I and II in acid solution at temperatures between 20° and 150° C. and preferably between 70° and 110° C. and allowing them to react for from 30 minutes to 2 hours with stirring.

The condensation products in which n is 1 are conveniently isolated by salting out, for example with sodium chloride and/or zinc chloride, sodium tetrafluoroborate or potassium chloride.

The condensation products in which n is 0 either precipitate on cooling of the acid reaction mixture or are precipitated as free bases on neutralization of the acid mixture. They are then isolated.

The compounds of Formula I may themselves be obtained from the corresponding hydroxy compounds by the Vilsmeier reaction, initially forming the corresponding immonium salts of the formula

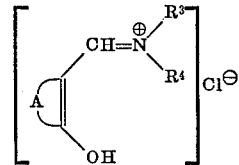

($R^3$ denotes for example $CH_3$ or $C_2H_5$; $R^4$ denotes for example $CH_3$, $C_2H_5$ or $C_6H_5$ or $C_6H_5$) which may, as well as the aldehydes obtainable therefrom by hydrolysis, be used for the condensation reaction with or without previous isolation.

The compounds of Formula II in which n is 0 are themselves obtained by known methods, for example by reacting compounds of the formula:

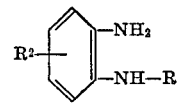

with alkyl cyanoacetate to form compounds of the formula:

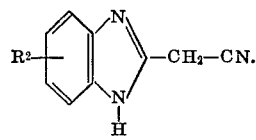

Compounds of Formula II in which n is 1 may be readily obtained from the above compounds by alkylation, for example with dimethyl sulfate or diethyl sulfate or mixtures thereof in water or solvents such as chloroform, ethylene chloride or chlorobenzene, or mixtures of water with such solvents.

The alkylated products may be isolated or, preferably, used without isolation. It is particularly advantageous to react the compound of Formula I with that of Formula II without previously isolating either of these compounds.

The compounds produced in accordance with the present invention, in which $n$ is 0, are valuable for dyeing and optically brightening textile materials capable of being dyed with disperse dyes, for example textile materials of synthetic polyamides, polyesters and polyacrylonitrile; and the compounds in which $n$ is 1 are preferred for dyeing and optically brightening textile materials capable of being dyed with cationic dyes, for example textile materials of acrylonitrile polymers or dicyanovinylidene polymers.

Of particular commercial interest are the dyes of the general formula:

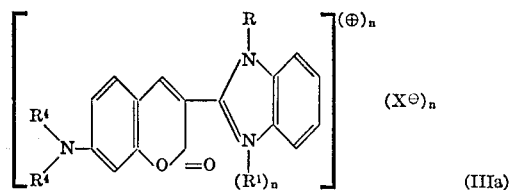

(IIIa)

in which $R^4$ denotes methyl or ethyl and $n$, $R$, $R^1$ and $X^\ominus$ have the meanings stated.

The German Pat. 1,098,125 and Swiss Pat. 452,474 disclose a process for the production of compounds of the general Formula III. In this known process compounds of the general formula:

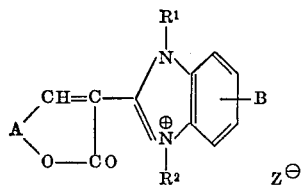

in which B denotes alkyl, alkoxy or, preferably, hydrogen and A denotes a divalent aromatic radical attached in the ortho position and $R^1$ and $R^2$ denote methyl and/or ethyl, are obtained, for example, by condensing for example an aldehyde of the general formula:

with a 2-cyanomethylbenzimidazole in the presence of a basic condensing agent in a solvent, for example, with piperidine in ethanol, to form compounds of the formulae:

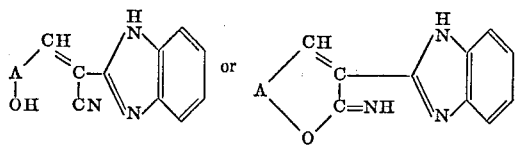

and isolating these products and reacting them with acids to form the protonated derivatives of the general formula:

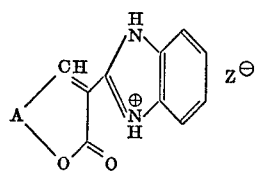

These derivatives may then be alkylated to compounds of the general formula

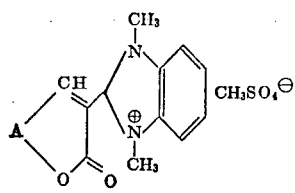

The alkylated compounds are isolated by solvent extraction of the dyes from the reaction mixtures and salting out.

Our new process for the manufacture of dyes of Formula III has considerable advantages over the previous process. In particular, it is very simple to operate and omits many of the steps necessary in the previous process.

In the following examples the parts and percentages are by weight unless otherwise stated.

EXAMPLE 1

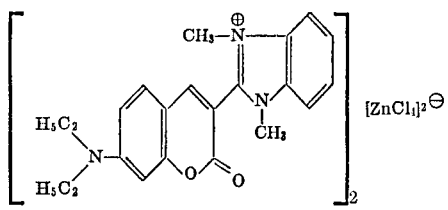

78.5 parts of 2-cyanomethylbenzimidazol and 26 parts of magnesium oxide are slurried in 200 parts of water and heated to 50° C. 160 parts of dimethyl sulfate are then added over 45 minutes, thus causing the temperature of the mixture to rise. The temperature may not exceed 70° C. The mixture is then stirred for a further 30 minutes at 70° C. and then cooled to room temperature. 95 parts of 4-diethylaminosalicylaldehyde are added and the pH is adjusted to 1 by the addition of 140 parts of 32% hydrochloric acid. The mixture is then heated to 90–95% C. and maintained at this temperature for 1 hour. The mixture is then cooled to 30–40° C., and a solution of 81.6 parts of anhydrous zinc chloride in 300 parts of water is added.

The precipitated crystalline dye is filtered off, washed with a little water and dried at 60° C.

There are thus obtained 180 parts of the yellow dye of the formula given above.

EXAMPLE 2

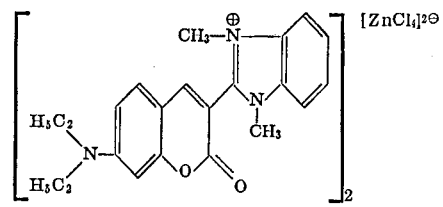

A solution of 212 parts of 3-diethylaminophenol in 2000 parts of chloroform and 915 parts of dimethyl formamide is prepared and 1000 parts of phosgene (in liquid form) are gradually added at from 10° to 20° C. This addition takes from 2 to 3 hours, after which the mixture is stirred for 30 minutes at 10–20° C. and then at the boil under reflux for 2 hours.

The reaction mixture is then poured onto 3000 parts of ice. To the resulting mixture there is then added an aqueous solution of 1,3-dimethyl-2-cyanomethylbenzimidazolium methosulfate obtained by the reaction of 196 parts of 2-cyanomethylbenzimidazole with dimethyl sulfate and magnesium oxide in water (cf. Example 1).

On completion of the addition the chloroform is distilled by heating, the final traces being removed by raising the temperature to 90–95° C. and maintaining the mixture at this temperature for 1 hour. The mixture is cooled to 20–30° C., and a solution of 204 parts of zinc chloride in 700 parts of water is added. The tetrachlorozincate of the dye precipitates as a crystalline solid and is filtered off, washed with a 10% sodium chloride solution and dried.

There are thus obtained 438 parts of the dye of the formula given above. When applied to polyacrylonitrile fabrics from aqueous solution, the dye yields bright yellow shades.

EXAMPLE 3

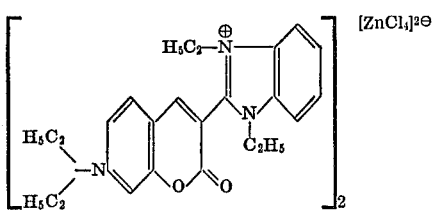

157 parts of 2-cyanomethylbenzimidazole are slurried with 150 parts of magnesium oxide in 400 parts of water, the slurry is heated to 65° C., and 1040 parts of diethyl sulfate are added over 4 hours at 65–70° C. On completion of the addition the mixture is stirred for a further hour at 70–75° C. and then cooled to room temperature. 190 parts of 4-diethylaminosalicylaldehyde and 255 parts of 32% hydrochloric acid are added and the mixture is reheated to 90–95° C. This temperature is maintained for 90 minutes. The mixture is then cooled to 30–40° C., and a solution of 136 parts of zinc chloride in 500 parts of water is then added to precipitate the dye as the zinc double salt, which is then filtered off, washed with a little water and dried. There are thus obtained 320 parts of the yellow dye salt of the formula given above.

EXAMPLE 4

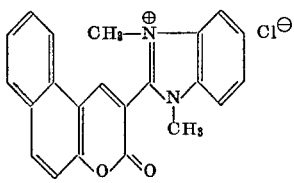

To a solution of 212 parts of 3-diethylaminophenol in 2000 parts of chloroform and 915 parts of dimethyl formamide there are greadually added, at 10–20° C., 1000 parts of phosgene (in liquid form). This addition takes from 2 to 3 hours, after which the mixture is stirred at 10–20° C. for 30 minutes and then heated at the boil under reflux for 2 hours with stirring. The reaction mixture is then poured onto 3000 parts of ice, 240 parts of 2-hydroxynaphthaldehyde are added, and the mixture is heated at 65–70° C. to distill off the chloroform. The temperature is then raised to 90–95° C. and the solution is stirred at this temperature until clear. The solution is then cooled, and the precipitated crystals are filtered off, washed with a sodium chloride solution and dried. There are thus obtained 300 parts of a yellow compound of the formula given above.

EXAMPLE 5

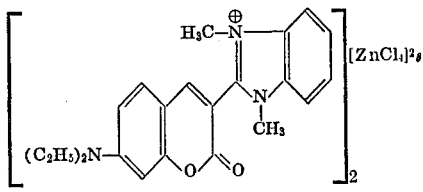

To a suspension of 157 parts of 2-cyanomethyl-benzimidazole in 1000 parts of chloroform there are added 55 parts of magnesium oxide. The mixture is heated under reflux (63° C.) and 344 parts of dimethyl sulfate are added over 1 hour. The mixture is then heated for a further 2 hours at the boil under reflux and then cooled to 20–30° C. There is added a solution of 4-diethylaminosalicylaldehyde in an acidic water/chloroform/dimethyl formamide mixture, obtained from 165 parts of 3-diethylaminophenol in the manner described in Example 2.

The combined mixture is heated at 60–70° C. to distill off the chloroform and then stirred for 1 hour at 90–95° C. The solution is then cooled to 20–30° C., and a solution of 163 parts of zinc chloride in 500 parts of water is added. The precipitated crystalline tetrachlorozincate is filtered off, washed with a 10% solution of sodium chloride and dried at 60–70° C.

There are thus obtained 345 parts of the yellow dye of the above formula.

EXAMPLE 6

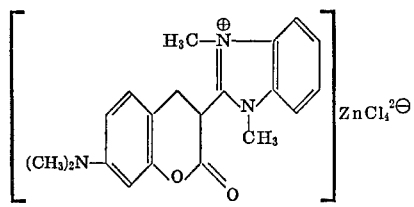

93 parts of 1,3-dimethyl-2-cyanomethylene benzimidazoline and 83 parts of 4-dimethylaminosalicylaldehyde are slurried in 1000 parts of water, 50 parts of 32% hydrochloric acid are added, and the mixture is heated for 2 hours at 90–95° C. The mixture is then cooled to 20–30° C., and a solution of 82 parts of zinc chloride in 400 parts of water is added.

The tetrachlorozincate is precipitated in the form of yellow crystals. These are filtered off, washed with a 10% solution of sodium chloride and dried at 70° C. There are thus obtained 206 parts of the dye of the above formula.

EXAMPLE 7

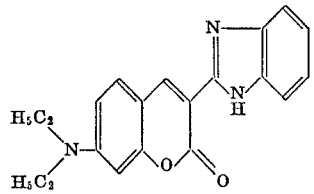

A solution of 212 parts of 3-diethylaminophenol in 915 parts of dimethyl formamide and 2000 parts of chloroform is prepared and 1000 parts of phosgene (in liquid form) are slowly added over from 2 to 3 hours at 10–20° C. The mixture is then stirred for 30 minutes at 10–20° C. and then heated at the boil under reflux for 2 hours with stirring. The reaction mixture is then poured onto 3000 parts of ice, and 196 parts of 2-cyanomethylbenzimidazole are added. Following the addition, the mixture is heated to distill off the chloroform. The final traces of the chloroform are removed by stirring for 1 hour at 90–95° C. The solution is cooled to 30° C. and adjusted to pH 4–5 by the addition of aqueous sodium hydroxide, after which the yellow precipitated crystals of dye of the formula given above are filtered off, washed with water and dried.

EXAMPLE 8

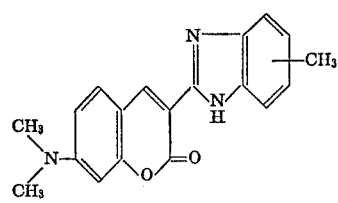

137 parts of 3-dimethylaminophenol are dissolved in 730 parts of dimethyl formamide and 1600 parts of chloroform, and 800 parts of phosgene are added over 2 hours at room temperature (10–20° C.). The mixture is then stirred for a further 30 minutes and thereafter heated under reflux. After 2 hours at 65–70° C., the reaction mixture is poured onto 1500 parts of ice and 170 parts of 2-cyanomethyl-methylbenzimidazole are added and the mixture is heated at 65–70° C. to distill off the chloroform. The final traces of chloroform are removed by heating at 90–95° C. with stirring for 1 hour. The acidic dye suspension is then cooled to 30° C., and the dye base is liberated by the addition of aqueous sodium hydroxide.

This is isolated in the form of yellow crystals by filtration, followed by washing and drying. The yield is 278 parts.

EXAMPLE 9

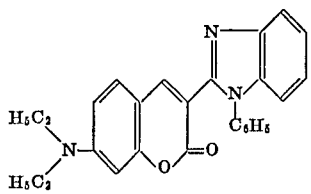

A solution of 19 parts of 4-diethylaminosalicylaldehyde and 23 parts of 1-phenyl-2-cyanomethylbenzimidazole in 75 parts of dimethyl formamide is heated with 20 parts of 32% hydrochloric acid to 100° C., maintained at this temperature for 1 hour and then adjusted to pH 4–5 by the addition of aqueous sodium hydroxide at 80–90° C. The dye precipitates in the form of yellow flakes, which are filtered off hot, washed with water and dried. There are thus obtained 34 parts of the dye of the formula given above.

EXAMPLE 10

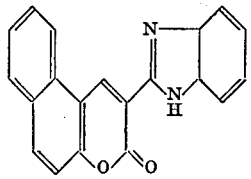

86 parts of 2-hydroxynaphthaldehyde and 78 parts of 2-cyanomethylbenzimidazole are dissolved in 300 parts of dimethylformamide and adjusted to pH 1 by the addition of 32% aqueous hydrochloric acid. The reaction mixture is then heated to 100° C., stirred at this temperature for 1 hour and then cooled to 30–40° C. It is neutralized by the addition of dilute aqueous sodium hydroxide. The precipitated yellow dye is filtered off and washed with water. After drying, 134 parts of the compound of the formula given above are obtained.

We claim:
1. A process for the production of a fluorescent compound of the formula

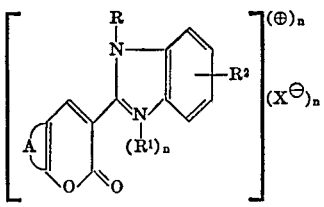

wherein A together with the attached two carbon atoms completes a ring which is benzene, naphthalene or benzene substituted by methyl, chlorine, hydroxy, phenyl-amino or dialkylamino of 1 to 4 carbon atoms in each alkyl group, with the proviso that A as substituted benzene contains not more than one amino group, not more than one hydroxy group and a total of not more than two substituents, $n$ is 0 or 1, R is hydrogen, methyl or ethyl, $R^1$ is methyl or ethyl, $R^2$ is hydrogen, methyl or methoxy and $X^\ominus$ is a chloride, bromide, nitrate, sulfate, methosulfate, ethosulfate, benzene sulfonate, toluene sulfonate, formate, acetate, tetrafluoborate or tetrachlorozincate anion, which process comprises:

condensing a compound of the formula

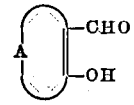

in which A has the same meaning given above, with a compound of the formula

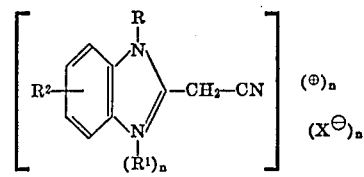

in which $n$, R, $R^1$, $R^2$ and $X^\ominus$ have the same meanings given above, in acidic aqueous solution at a pH of from 0 to 4 and at a temperature between 20° C. and 150° C.

2. A process as claimed in claim 1 carried out at a pH of from 0 to 2.

3. A process as claimed in claim 1 carried out at a temperature between about 70° C. and 110° C.

References Cited
UNITED STATES PATENTS

| | | | |
|---|---|---|---|
| 3,014,041 | 12/1961 | Hausermann et al. | 260—309.2 |
| 3,271,412 | 9/1966 | Raue et al. | 260—309.2 |
| 3,278,547 | 10/1966 | Brown et al. | 260—309.2 |
| 3,636,004 | 1/1972 | Bode et al. | 260—309 |
| 2,881,186 | 4/1959 | Hausermann | 260—343.2 R |
| 3,525,753 | 8/1970 | Sarkar | 252—301.2 W |

FOREIGN PATENTS

| | | | |
|---|---|---|---|
| 452,474 | 5/1968 | Switzerland | 260—309.2 |
| 372,307 | 11/1963 | Switzerland | 260—309.2 |

OTHER REFERENCES
Sethna: Chem. Rev., vol. 36, pp. 24–5 (1945).

NATALIE TROUSOF, Primary Examiner

U.S. Cl. X.R.

8—177 R, 178 R, 179; 252—301.2 W, 301.3 W; 260—309.2

UNITED STATES PATENT OFFICE
CERTIFICATE OF CORRECTION

Patent No. 3,766,199      Dated October 16, 1973

Inventor(s) Johannes Dehnert and Gerhard Grau

It is certified that error appears in the above-identified patent and that said Letters Patent are hereby corrected as shown below:

Column 1, line 33, illustration II, "( $\ominus$ )n" should read -- ( $\oplus$ )n --.

Column 2, line 44, delete one of the "or $C_6H_5$".

Column 4, line 30, "%" should read -- $^\circ$ --.

Column 4, line 74, "solution" should read -- solutions --.

Column 5, line 37, "greadually" should read -- gradually --.

Signed and sealed this 15th day of October 1974.

(SEAL)
Attest:

McCOY M. GIBSON JR.      C. MARSHALL DANN
Attesting Officer      Commissioner of Patents